To Vacuum Pump

INVENTORS
Alfred E. Badger and
John W. Herbert

Nobbe & Swope
ATTORNEYS

United States Patent Office 3,334,983
Patented Aug. 8, 1967

3,334,983
APPARATUS FOR INHIBITING UPWARD RISING BUBBLES IN A MOLTEN METAL BATH
Alfred E. Badger, Maumee, and John W. Herbert, Toledo, Ohio, assignors to Libbey-Owens-Ford Glass Company, Toledo, Ohio, a corporation of Ohio
Filed Dec. 8, 1964, Ser. No. 416,742
6 Claims. (Cl. 65—182)

The present invention relates broadly to the production of flat glass by the so-called float process and more particularly to a method and apparatus for minimizing if not entirely eliminating the formation of defects such as open bottom blisters during the production of a continuous ribbon by this procedure.

As explained in U.S. Patent 3,083,551, issued Apr. 2, 1963, in practicing the float process, glass (either in ribbon form or in the molten state) is delivered at a controlled rate onto a bath of molten metal such as tin and is advanced along the surface of the metal bath under thermal and mechanical conditions which assure (1) that a body of molten glass that is free to flow laterally is established on the molten metal, and (2) that from this molten glass body there will develop on the surface of the metal bath a buoyant layer of molten glass of stable thickness. As this layer of stable thickness develops it is supported on and continuously advanced in ribbon form over the surface of the molten metal bath and sufficiently cooled as it advances to permit it to be finally removed unharmed from the molten metal.

Thus, at elevated temperatures, e.g., 900° C. or over, such a buoyant (freely floating) body or layer of molten glass, when supported on a bath of molten metal such as tin, automatically achieves a condition of equilibrium, and therefore of stable thickness, if it is permitted to flow laterally on the bath without constraint, the stable thickness being achieved when the lateral flow ceases, i.e., when equilibrium has been established between the forces of surface tension of the molten glass and the molten metal and the forces of gravity.

As also explained in U.S. Patent 3,083,551, the thickness of the ultimate ribbon may be the equilibrium thickness of the glass in the molten layer or the thickness of the ultimate ribbon may be modified by increasing the speed of the conveying means used to remove the ribbon from the molten metal bath, thus attenuating the glass layer of stable thickness as it advances to produce an ultimate ribbon of less thickness than the equilibrium thickness of the glass.

In any event, in creating the condition of equilibrium in the molten glass and as the glass layer achieves a stable and/or ultimate thickness any distortion entirely disappears and the layer of glass which has assumed level formation on the molten metal bath develops as a ribbon of glass of uniform thickness that is free of distortion and has a fire finish. These are the principal advantages of the "float" process.

However considerable difficulty has been encountered in actual commercial production of float glass due to the unexplained presence of bubbles rising upwardly through the molten metal bath and which, when they reach the lower surface of the glass layer or ribbon on the bath form what may be described as open-bottom blisters in the ribbon.

These bubbles that rise through the molten metal may occur at a number of locations in the bath but usually occur in a relatively restricted area in the vicinity of the forward wall of the container for the molten metal. Their source is not known and their number may vary, with different installations and with different refractories in the container, from a few bubbles per hour to several hundred thousand.

Bubbles rising through the molten metal bath and impinging on the lower surface of the glass floating thereon present a very serious problem in the relatively new art of making "float" glass and workers have evolved widely varying theories as to the cause of the bubbles and have suggested a wide variety of possible solutions, not necessarily related to any theory as to their source. However, not until the present invention have any of these suggestions provided a real and a commercially feasible answer to the difficulty.

Generally stated, this invention is based on applicants' discovery that, when the casing in which the refractory walls of the container for the bath of molten metal is conventionally enclosed, and particularly the bottom thereof, is provided with an opening or openings through which gas can escape or be positively removed, the bubble condition in the molten metal bath is either entirely eliminated or reduced to a point where it has no seriously detrimental effect on the quality of the float glass being produced.

It is therefore a primary object of this invention to improve the quality of float glass by minimizing if not entirely eliminating upwardly rising bubbles in the bath of molten metal upon which the glass floats.

Another object is to provide means associated with the casing surrounding the container for the molten metal bath for releasing pressure from said casing.

Still another object is the provision of means associated with said casing for removing gas therefrom.

Further objects and advantages of the invention will become more apparent during the course of the following description when taken in connection with the accompanying drawings.

In the drawings, wherein like numerals are employed to designate like parts throughout the same:

Figure 1:
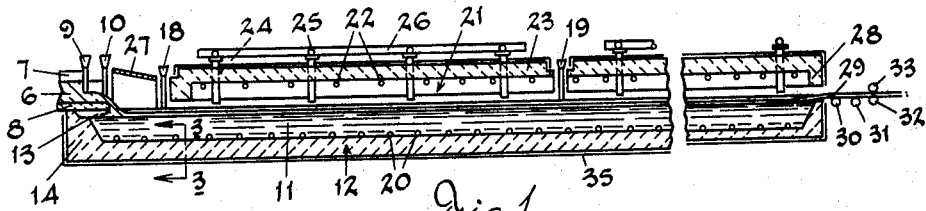
FIG. 1 is a central, longitudinal, vertical, sectional view through a typical form of float glass apparatus.
Figure 2:
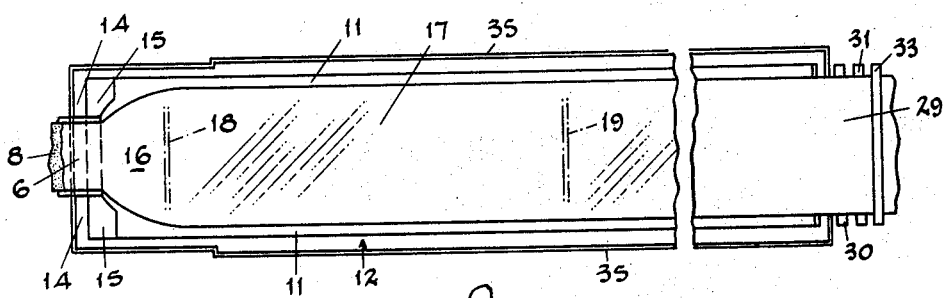
FIG. 2 is a plan view of the apparatus of FIG. 1 with the superstructure removed.

Referring now more particularly to the drawings, there has been illustrated in FIGS. 1 and 2 a typical float glass apparatus similar to one disclosed in U.S. Patent No. 3,083,551.

As there shown, glass 6 in molten form is supplied from a forehearth 7 to a spout lip 8, with the flow of molten glass from the spout lip being constantly regulated and controlled by a regulating tweel 9 and a gate 10.

The spout 8 is vertically spaced from the surface of a bath 11 of molten metal, such as tin contained in a tank 12, so that the molten glass has a free fall of a few inches to the metal bath, and the distance is such as to insure a heel 13 being formed behind the glass flowing to the bath which heel is extended rearwardly under the spout lip 8 to the end wall 14.

The molten metal of which the bath 11 is constituted is covered at the entry end to each side of the heel by tile 15 (FIG. 2) which extends from the end wall 14 forwardly of the spout lip 8 so that the surface of the bath under the spout which would otherwise be exposed is protected against access thereto of outside air. The molten glass flowing from the spout flows over the spout lip 8 forwardly onto the bath on which the glass is advanced.

On leaving the spout 8 the glass forms a buoyant molten body indicated at 16 on the metal bath 11 and a buoyant layer of stable thickness 17 is developed therefrom by the maintenance of a temperature of 1000° C. or more in that part of the bath between tweels 18 and 19.

The temperature of the bath in the tank structure is regulated from the inlet end to the discharge end by providing thermal regulators, indicated at 20, immersed in the molten metal. The headspace 21 over the bath is preferably heated by radiant heat directed downwardly from heaters 22.

The thermal regulators 20, 22 at the entry end of the apparatus are devised to maintain a temperature of about 1000° C. or slightly higher over a sufficient length of the bath to transform the glass into a buoyant body 16 from which is developed a buoyant layer 17 of molten glass of stable thickness. This length of the bath is defined between the tweel 19 and the end wall 14 at the entry end of the structure, and the thermal regulators 20 and 22 disposed between the tweel 19 and the end wall 28 at the discharge end of the apparatus are controlled so that the molten glass of stable thickness in ribbon form which has passed under the tweel 19 is progressively cooled from there to the discharge end.

To assist the regulation of the temperature between the tweel 19 and the discharge end, other tweels may be provided so as to further partition the headspace 21 over the bath. For example, a suitable temperature gradient of descending values may be achieved by adjusting the temperature so that the temperature of the bath under the headspace up to the tweel 19 is about 1000° C., and subsequently descends to 825° C., and then further descends to a temperature at which the ribbon surface has been sufficiently stiffened to allow its transfer to a lehr on mechanical conveying means without detriment to the surfaces, e.g., a temperature (about 650° C.) at which the viscosity is about $10^7$ poises.

The headspace 21 or chamber, which contains the "float atmosphere," is enclosed by a roof structure 23 which, with extension 27, makes it possible to maintain a sufficient volume of protecting gas over that part of the metal bath 11 that is exposed at each side of the molten glass in the chamber. This roof structure 23 is provided at intervals with ducting 24 connected by branches 25 to headers 26 through which the protecting gas is fed into the headspace 21 at a rate to create a plenum therein. The protecting gas is one which will not chemically react with tin to produce contaminants of the glass as for example tin oxide or a tin sulphide and by providing a plenum ingress to the headspace 21 entrance of atmospheric air is prevented.

The headers may be sectionalized so as to extend for predetermined lengths along the bath corresponding to the distance between tweels and provided with heaters so that the temperature of the protecting gas entering the headspace may be precisely regulated.

To remove the ultimate ribbon 29 from the molten metal bath, there is mounted, outside of the discharge end of the tank, mechanical receiving and conveying means exemplified by supporting rollers 30 to 32 and superimposed roller 33. Any or all of the rollers 30 to 33 may be driven and cooperate to apply a tractive effort to the ribbon of glass moving towards the outlet, which tractive effort also assists in advancing the glass along the bath and may be increased to attenuate the ribbon when a thickness less than the equilibrium thickness of the glass is desired.

As indicated above it is conventional in containers for molten metal to employ refractory walls and to enclose these walls in a solid casing usually of metal to prevent leakage of the molten metal through joints between, or through cracks or fissures in, the refractory blocks from which the walls of the container are made.

This is particularly true in the case of containers for the molten metal bath in float glass apparatus because the metal most commonly used is tin, which has a very high fluidity and low melting point; and because of the importance of keeping the "float atmosphere" in and air out of the apparatus.

Such refractory block walls are shown at 34 in FIGS. 1 and 2 and a metal casing surrounding and enclosing at least the refractory walls of the tank 12 is shown at 35. In fact, when upwardly rising bubbles in the molten metal bath have occurred during the operation of float glass machines, efforts have been made to seal the metal casing 35 as tightly as possible on the theory that the bubbles might result from outside air entering into the metal casing.

Figure 3:
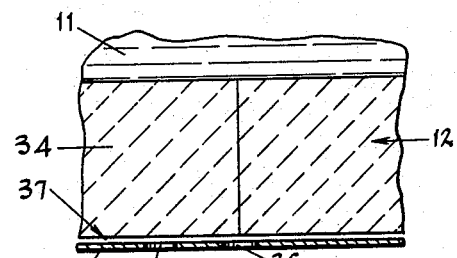
FIG. 3 is a fragmentary, vertical, sectional view taken substantially along the line 3—3 in FIG. 1 showing one form of the venting or pressure releasing means of the invention.

Now, however, applicants have discovered that these bubbles can be very greatly reduced, if not eliminated, by releasing pressure that appears to build up within the casing 35 in the operation of a conventional float glass apparatus. In its simplest form this can be accomplished by the provision of small openings in the casing and preferably in the bottom walls as shown at 36 in FIG. 3. The openings 36 may communicate with surrounding areas within the casing through a space 37 between the casing and the refractory blocks and as many openings may be provided as are necessary to relieve the pressure within the casing to a point where it will not create upwardly rising bubbles in the molten bath. Any pattern of openings may be used but, since the bubbles most often appear in a relatively restricted area, it is generally desirable to employ a pattern of openings 36 that substantially conforms in size and shape with the area in which the bubbles appear.

On the other hand, the same or improved results can be obtained, particularly in cases where the number of bubbles that form per hour is high, by employing a positive means of releasing or reducing pressure within the casing 35. One form of apparatus which may be used to accomplish this is illustrated diagrammatically in FIG. 4 of the drawings. As there shown there is mounted in registry with a release opening 36 in the casing 35 a connection 38 including a control valve 39 and a pipe 40 leading to a vacuum (not shown).

When this type of apparatus is employed the number of openings 36 in the casing 35 can of course be materially reduced and in fact in many cases a single release opening connected to a vacuum pump will be sufficient to control objectionable bubbling in the molten metal bath.

Figure 4:
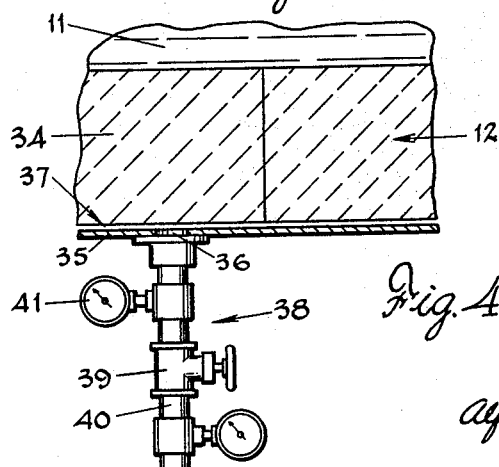
FIG. 4 is a similar view showing diagrammatically one form of apparatus that can be employed for positively removing gases from the casing around the container for the molten metal bath.

The amount of vacuum employed with an apparatus such as shown in FIG. 4 will of course be dependent on the number of bubbles it is necessary to control, the number of release openings connected to the vacuum pump and on other conditions peculiar to the particular float apparatus.

By way of example only, it can be stated that in one specific installation, in which an apparatus such as shown in FIG. 4 was utilized, when the valve 39 was completely closed to shut off the pull of the vacuum pump on the release opening 36 the gauge 41 showed a slight build up of pressure within the casing 35. Under these circumstances the application to the release openings 36 of a vacuum somewhat greater in degree than the pressure was found adequate to control bubble formation in the molten metal.

It is of course to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In apparatus for producing float glass, a container for a bath of molten metal comprising a plurality of refractory blocks arranged in contacting relation to form the bottom and side walls of a tank, a solid casing covering the bottom wall of said tank and extending upwardly over the side walls thereof and having an opening therein for releasing pressure therefrom.

2. Apparatus as defined in claim 1 in which means is connected to said opening for withdrawing gas from said casing.

3. In apparatus for producing float glass, a tank having bottom and side walls made up of refractory blocks, a bath of molten metal in said tank, means for maintaining the metal in said tank in a molten condition and at predetermined temperatures, and a solid casing covering the bottom wall and extending upwardly over the side walls of said tank and having an opening therein for releasing pressure therefrom.

4. Apparatus as defined in claim 3 in which means are provided in communication with the opening in said casing for withdrawing gas therefrom.

5. In apparatus for producing float glass, a tank having bottom and side walls made up of refractory blocks, a bath of molten metal in said tank, means for maintaining the metal in said tank in a molten condition and at predetermined temperatures, and a solid casing covering the bottom wall and extending upwardly over the side walls of said tank and vented to reduce pressure therein.

6. Apparatus as defined in claim 5 in which said vented casing is provided with means for positively withdrawing gas therefrom.

References Cited
FOREIGN PATENTS 1,365,777   5/1964   France.

DONALL H. SYLVESTER, *Primary Examiner.*

G. R. MYERS, *Assistant Examiner.*